July 1, 1930.  C. A. LUTHER  1,769,149
BROILER PAN
Filed Nov. 27, 1928
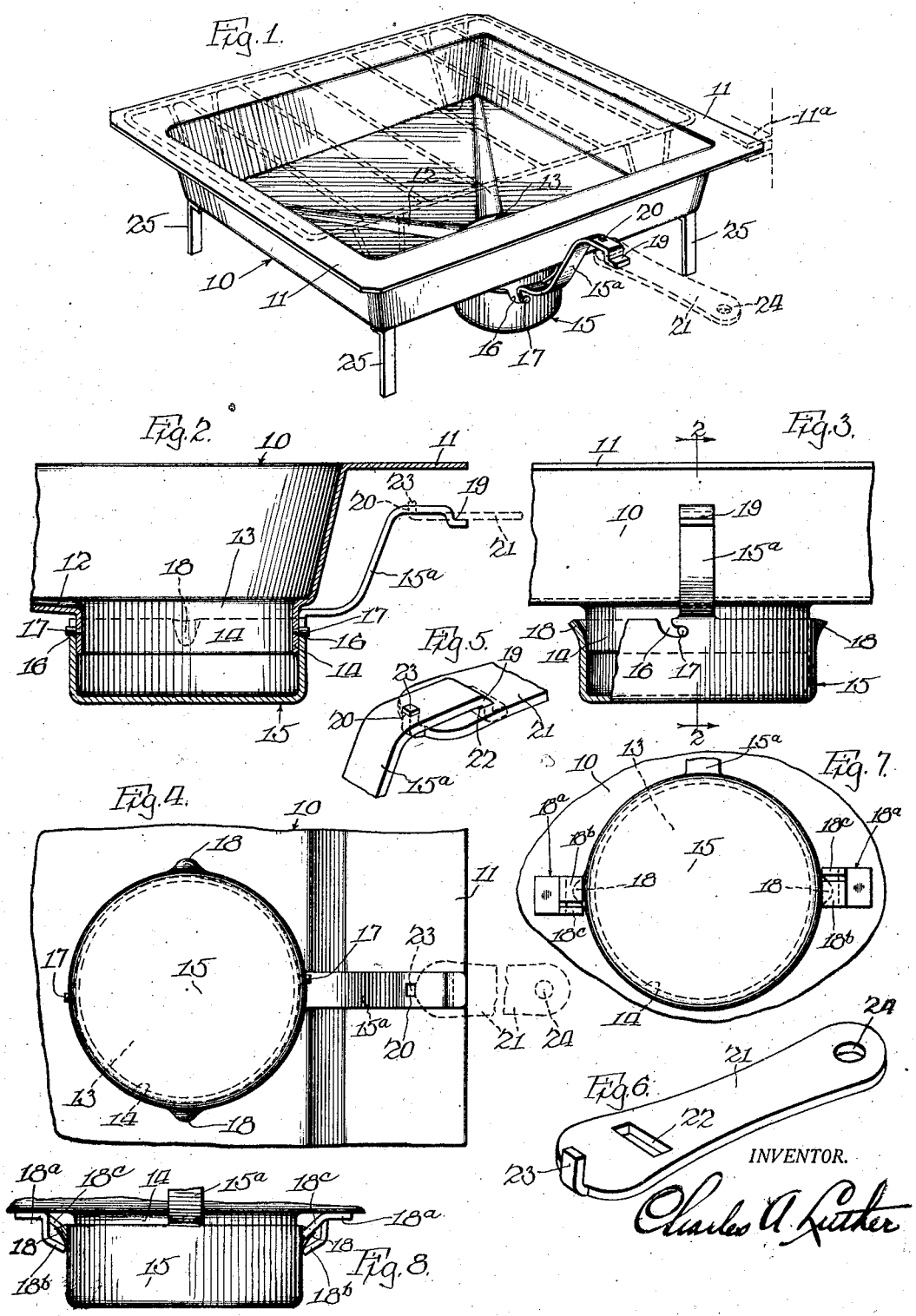
INVENTOR.
Charles A. Luther Patented July 1, 1930

1,769,149

UNITED STATES PATENT OFFICE

CHARLES A. LUTHER, OF CHICAGO, ILLINOIS

BROILER PAN

Application filed November 27, 1928. Serial No. 322,185.

This invention relates to improvements in broiler pans of the type embodying means for collecting the meat juices and greases in a separate receptacle.

The object of the invention is to construct a broiler pan that is simple and strong in construction and inexpensive to manufacture, having a separate receptacle for retaining the juices and greases which receptacle may be readily removed without removing the broiler pan.

Another object of the invention is to provide an improved broiler pan which will render it impossible for the drippings from the meat being broiled to catch fire from the flames.

A still further object of the invention is to provide a locking means for the receptacle, whereby the same may be securely held in position when in use and the handle of which may be used to withdraw the pan.

These features are accomplished by means of the device disclosed in the drawings forming a part of the specification; and in which;

Figure 1 is a perspective view of the broiler pan with the device attached;

Fig. 2 is a section on the line 2—2 of Fig. 3;

Fig. 3 is a front elevation, showing the grease receptacle attached;

Fig. 4 is a bottom plan view of Fig. 2;

Fig. 5 is a detail perspective view of the handle with the auxiliary handle attached;

Fig. 6 is a perspective view of the auxiliary handle;

Fig. 7 is a bottom plan view of a modified form of lock;

Fig. 8 is a side elevation of Fig. 7.

Referring to the drawings 10 designates the broiler pan which may be of any suitable shape, but preferably rectangular as shown, comprising a bottom and side walls and provided with outwardly extending lateral flanges 11 adapted to slide and rest in guideways 11$^a$ (indicated by dotted lines) formed in the oven walls.

The bottom of the pan is provided with a plurality of inclined depressions 12, to guide the flow of grease or drippings to an opening 13 of the pan. This opening 13 has a downwardly extending cylindrical flange 14 surrounding which is supported a cup-shaped receptacle or container designated as a whole as 15, and provided with a projection 15$^a$ extending outwardly, which may be used in some instances for the withdrawal of the pan, as well as for the removal of the receptacle. Bayonet slots 16 are provided in the cup or receptacle 15 which engage pins 17 secured to the cylindrical flange 14, so that when the receptacle 15 is placed over the flange 14, and the bayonet slots 16 register with the pins 17, only a slight turn is required to lock the receptacle to the pan.

To facilitate the pouring off of the grease or juices that have accumulated during the process of broiling the receptacle 15 is provided with an outwardly flared lip 18 on each side thereof.

As shown in Figs. 7 and 8 the receptacle or container 15 may be held in locked position by means of a pair of Z-shaped brackets 18$^a$ welded to the bottom of the pan or secured in any suitable manner, and having an inwardly turned portion 18$^b$ thereof to engage the flared lips 18—18 and provided with a stop or shoulder 18$^c$ to limit the turning of the receptacle in one direction.

The projection 15$^a$ is constructed with a downwardly and outwardly portion 19 at its extremity and an aperture 20 so as to permit of an auxiliary handle 21 to be removably attached thereto. The handle 21 may be of flat stock having a rectangular opening 22 through which the portion 19 of the container projection 15$^a$ is inserted and an upwardly turned ear 23 engaging the aperture 20.

A hole 24 is provided in the handle 21, the same being suspended when not in use.

If the pan is to be rested upon a stove or the like it is equipped with depending supports 25 which are of a greater length than the extending of the flange and container and will allow the pan to be rested without the danger of upsetting and also to allow for the removal of the receptacle or container. When it is desired to use the drippings or greases for gravy or the like, the same may be made in the container without the use of another pan.

I contemplate as being included in these improvements all such changes, variations and departures from what is thus specifically illustrated and described herein as fall within the scope of the appended claims.

I claim:

1. A broiler pan comprising a bottom wall and side walls, the bottom wall having a drip opening therethrough, a drip receptacle, and means for releasably attaching the drip receptacle to the bottom wall and below said drip opening, said means being released by a rotating movement of the receptacle about a vertical axis.

2. A broiler pan comprising a bottom wall and side walls, the bottom wall having a flanged drip opening therethrough, a cup-shaped drip receptacle surrounding said flange, engaging means positioned between said bottom wall and means for releasably attaching the drip receptacle to the bottom wall and below said drip opening, said means being released by a rotating movement of the receptacle about a vertical axis.

3. A broiler pan comprising a bottom wall and side walls, the bottom wall having a flanged drip opening therethrough, there being a plurality of inclined substantially radial depressions in the bottom wall sloping toward said opening, a drip receptacle below the bottom wall opening, and means for releasably attaching the drip receptacle to the bottom wall and below said drip opening, said means being released by a rotating movement of the receptacle about a vertical axis.

4. A broiler pan comprising a bottom wall and side walls, the bottom wall having a drip opening therethrough, a drip receptacle, interengaging means operable by a turning movement of the receptacle on a normally vertical axis relative to the pan and positioned between said bottom wall and said receptacle, for releasably attaching the drip receptacle to the bottom wall and below said drip opening, said means being released by a rotating movement of the receptacle about a vertical axis, a projecting element on said receptacle for effecting such turning movements, and a handle readily attachable to and removable from said projecting element.

5. A broiler pan comprising a bottom wall and side walls, a plurality of depending supports secured to said bottom wall, said bottom wall having a drip opening therethrough, a drip receptacle positioned below said opening, interengaging means of the bayonet-slot type positioned between said bottom wall and the receptacle and means for turning the receptacle to release the receptacle from and secure same to the pan.

6. A broiler pan comprising a bottom wall and side walls, a plurality of leg-like supports secured to said bottom wall to hold the pan substantially horizontal when standing on a table-top or the like, the side walls having laterally extending flanges for engaging guides in an oven for bodily suspending said pan therein, the bottom wall having a flanged drip opening therethrough, there being a plurality of inclined substantially radial depressions in the bottom wall sloping toward said opening, a drip receptacle positioned below the bottom wall opening, receptacle-supporting-and-locking means for holding the receptacle readily releasable below said opening and being dependent for locking and release upon a turning movement of the receptacle on a substantially vertical axis, and means for turning the receptacle on such axis.

CHARLES A. LUTHER.